No. 679,588. Patented July 30, 1901.
C. A. & O. ANDERSON.
CAMP COOKING UTENSIL.
(Application filed Oct. 16, 1900. Renewed July 1, 1901.)

(No Model.)

Witnesses:
W. H. Babcock
M. A. Davis

Inventors
Charles A. Anderson
Oscar Anderson
By Davis & Davis
Attorneys

UNITED STATES PATENT OFFICE.

CHARLES A. ANDERSON AND OSCAR ANDERSON, OF PORTLAND, OREGON.

CAMP COOKING UTENSIL.

SPECIFICATION forming part of Letters Patent No. 679,588, dated July 30, 1901.

Application filed October 16, 1900. Renewed July 1, 1901. Serial No. 66,794. (No model.)

*To all whom it may concern:*

Be it known that we, CHARLES A. ANDERSON and OSCAR ANDERSON, citizens of the United States, residing at Portland, in the county of Multnomah and State of Oregon, have invented certain new and useful Improvements in Camp Cooking Utensils, of which the following is a specification, reference being had therein to the accompanying drawings, in which—

Figure 1:
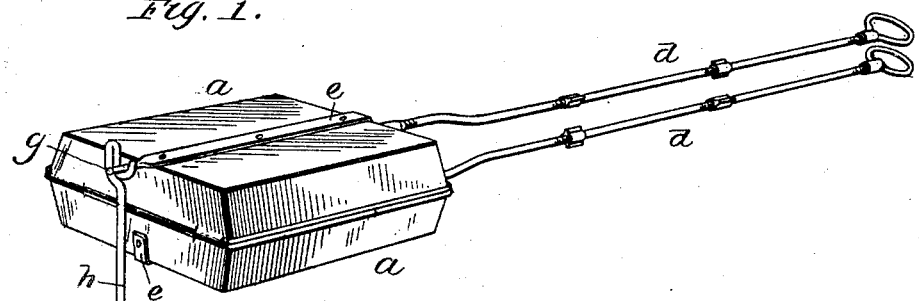
Figure 2:
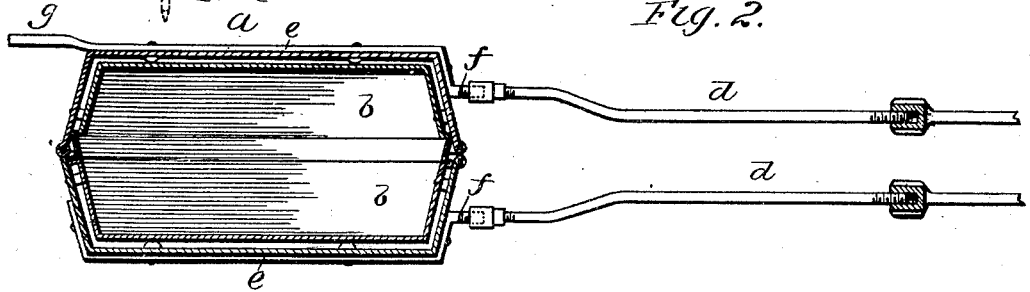
Figure 3:
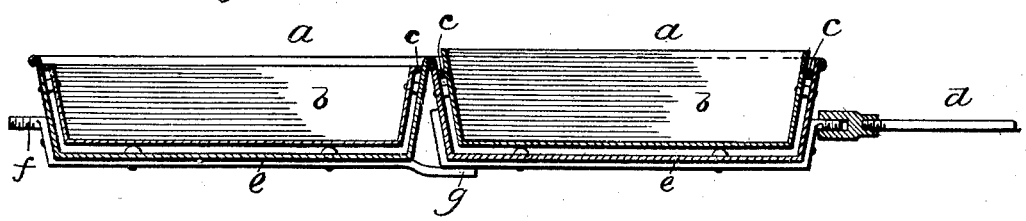
Figure 4:

Figure 1 is a perspective view of the utensil as it appears when used as a bake-pan; Fig. 2, a vertical sectional view of the same; Fig. 3, a vertical sectional view of the utensil with the two sections opened out and adapted for use as a double frying-pan, and Fig. 4 a detail section showing the joint between the two sections.

The object of this invention is to provide an extremely simple, light, and inexpensive cooking utensil especially adapted for the use of campers, it being adapted to occupy but little space and to be used for baking bread or other food products and also for frying meats, potatoes, &c., as more fully hereinafter set forth.

The apparatus consists of two pan-like sections $a$ of substantially rectangular shape and hinged together at one edge, the two sections being substantially alike in shape and dimensions, so that when closed one upon the other they form an entirely inclosed receptacle for baking bread, &c., as shown in Figs. 1 and 2. Each section is provided with a sheet-metal lining $b$, which is suitably riveted to the inner surface of the pan and is supported a sufficient distance away from the same to form a dead-air space entirely around the pan, the object of which is to prevent the bread or other food being cooked from coming in direct contact with the metal that is subjected to the flames of the fire and being thereby burned. The edges of the linings $b$ are flanged outward at $c$, and these flanges contact with the wall of the outer section all around, and thereby close the space between the lining and the exterior pan and prevent a circulation of air and also the ingress of food and cinders from the fire. The edge of one of the linings terminates short of the edge of the pan, and the edge of the opposite lining projects beyond the edge of the pan a short distance, so that when the two sections of the pan are brought together the joint between the two linings will come within one of the sections—*i. e.*, out of alinement with the joint between the pan-sections proper—whereby the ingress of foreign matters into the food-compartment will be more surely provided against.

Connected to each section is a handle $d$, which is constructed of several separable sections, preferably of such a length that when separated they may be inclosed within the pan-sections for the sake of compactness and convenience in transportation. The sections of the handle are connected together by suitable screw devices, and each handle is connected to its section through the medium of a strap-iron $e$, which is riveted to the bottom of the section and extends entirely across the same, the end of this strap-iron to which the handle is secured being provided with a threaded stem $f$, to which the handle is removably screwed. The straps are bent to conform to the shape of the pans, so that they brace and support the pans and afford a firm connection with the handles. One of the straps at the end opposite the connection to the handle and adjacent to the hinge is extended beyond the pan and formed into a rounded pin $g$, which is adapted to rest in the fork of a suitable stake $h$, driven into the ground adjacent to the open fire to support the utensil when it is employed as a bake-pan, as shown clearly in Fig. 1.

It will be observed that when the sections open out, as shown in Fig. 3, they are adapted for use as a double frying-pan, it being possible to fry meat in one of the sections and potatoes or some other vegetable in the other section. In this use of the utensil the supporting-pin $g$ engages under the opposite section, as shown in Fig. 3, and is thereby firmly supported approximately in alinement with the other section, relieving the hinge connection between the pans of the greater part of the weight of the pin-carrying section and its contents. In this use of the apparatus one of the handles is disconnected from its stem $f$ for convenience, and when thus disconnected the apparatus will be handy to manipulate by a single handle. It will also be observed that when the apparatus is opened out for use as a frying-pan the pin $g$ may still be engaged in the crotch of the stake, if desired, to support the sections in their open position.

Having thus fully described our invention, what we claim, and desire to secure by Letters Patent, is—

1. A cooking utensil comprised of a pair of pan-sections fitting one upon the other and forming a closed receptacle, a lining attached to the interior of each section and forming an air-space all around the same, and means for closing the air-spaces at the edges of the respective pans, the two edges of the linings coming together within one of the pan-sections out of alinement with the joint between said two pan-sections.

2. In a cooking utensil, the combination of a pair of pan-sections hinged together and adapted to close one upon the other and form a closed receptacle and to be opened out to form a pair of open receptacles, a pair of handles connected to the pans at the adjacent ends of the same, one to each pan, and a supporting-pin $g$ projecting centrally from one of the pans at a point opposite the point where the handle is connected thereto, said pin being adapted to engage a supporting-stake and support both sections when closed and also to engage under the opposite section or pan when the pans are open, for the purpose set forth.

3. A cooking utensil comprising a pair of hinged pan-sections adapted to close one upon the other and form a closed receptacle and to open out and form a pair of open receptacles, a strap-iron extending entirely across the bottom of each pan and secured thereto, one end of each strap-iron being extended and formed into a stem and the opposite end of one of the strap-irons being formed into a supporting-pin, and a pair of handles detachably connected to said stems.

In testimony whereof we hereunto affix our signatures, in the presence of two witnesses, this 5th day of October, 1900.

CHARLES A. ANDERSON.
OSCAR ANDERSON.

Witnesses:
CHARLES SUPREY,
GEO. S. PARKER.